(12) United States Patent
Luehn et al.

(10) Patent No.: US 10,035,416 B2
(45) Date of Patent: Jul. 31, 2018

(54) OPERATING-FLUID CONTAINER

(71) Applicant: Kautex Textron GmbH & Co. KG, Bonn (DE)

(72) Inventors: Holger Luehn, St. Augustin (DE); Nicolai Schumacker, Bonn (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 33 days.

(21) Appl. No.: 14/779,275

(22) PCT Filed: Mar. 17, 2014

(86) PCT No.: PCT/EP2014/055271
§ 371 (c)(1),
(2) Date: Sep. 22, 2015

(87) PCT Pub. No.: WO2014/147014
PCT Pub. Date: Sep. 25, 2014

(65) Prior Publication Data
US 2016/0052385 A1 Feb. 25, 2016

(30) Foreign Application Priority Data
Mar. 22, 2013 (DE) .................. 10 2013 004 929

(51) Int. Cl.
*B60K 15/03* (2006.01)
*B29C 45/16* (2006.01)
(Continued)

(52) U.S. Cl.
CPC .... *B60K 15/03177* (2013.01); *B29C 45/1642* (2013.01); *B29C 2045/1692* (2013.01);
(Continued)

(58) Field of Classification Search
CPC ........ B60K 15/03177; B60K 15/03006; B60K 2015/03046; B60K 2015/03493;
(Continued)

(56) References Cited

U.S. PATENT DOCUMENTS 3,755,040 A * 8/1973 Robinson ............... B29C 51/00
156/242
4,435,240 A * 3/1984 Knaus ................... B60K 15/00
156/242
(Continued)

FOREIGN PATENT DOCUMENTS

DE 19909041 A1 9/2000
EP 0571876 A1 12/1993
(Continued)

OTHER PUBLICATIONS

PCT Search Report and Written Opinion dated Aug. 12, 2014, received in corresponding PCT Application No. PCT/EP14/55271, 10 pgs.
(Continued)

*Primary Examiner* — J. Gregory Pickett
*Assistant Examiner* — Niki M Eloshway
(74) *Attorney, Agent, or Firm* — Grossman, Tucker, Perreault & Pfleger, PLLC

(57) ABSTRACT

The invention relates to an operating-fluid container (1) for a motor vehicle, comprising a container body which is assembled from two mutually complementary injection-molded shells (2a, 2b) which consist of thermoplastic material and are welded together in an encircling manner to form a substantially closed hollow body, wherein at least one shell (2a, 2b) is at least in regions formed from thermoplastic materials having different strengths, wherein at least one part-region consists of a thermoplastic material having a
(Continued)

Figure 1:
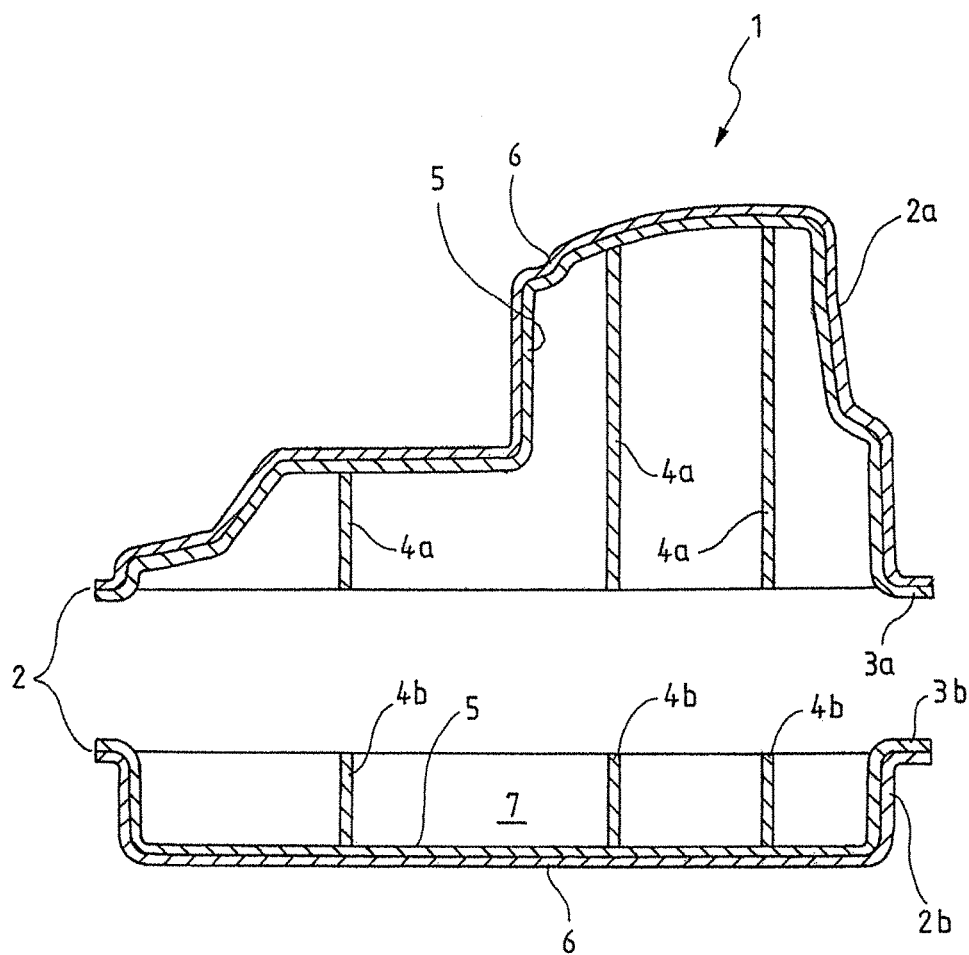

fibrous filling, wherein the shell (2a, 2b) has been obtained by way of a co-injection process during injection molding.

12 Claims, 2 Drawing Sheets

(51) Int. Cl.
*B60K 13/04* (2006.01)
*B60K 15/077* (2006.01)
*B29L 31/00* (2006.01)

(52) U.S. Cl.
CPC ....... *B29L 2031/7172* (2013.01); *B60K 13/04* (2013.01); *B60K 2015/03032* (2013.01); *B60K 2015/0344* (2013.01); *B60K 2015/0346* (2013.01); *B60K 2015/03046* (2013.01); *B60K 2015/03375* (2013.01); *B60K 2015/03493* (2013.01); *B60K 2015/0775* (2013.01); *B60K 2015/0777* (2013.01)

(58) Field of Classification Search
CPC ............ B60K 2015/0344; B60K 13/04; B60K 2015/03032; B60K 2015/03375; B60K 2015/0346; B60K 2015/0777; B60K 2015/0775; B29C 45/0642; B29C 2045/1692; B29L 2031/7172
USPC .......................... 220/562, 563, 62.19, 52.22
See application file for complete search history.

(56) References Cited

U.S. PATENT DOCUMENTS

| | | | |
|---|---|---|---|
| 4,453,564 A | 6/1984 | Bergesio | |
| 5,000,990 A | 3/1991 | Freeman | |
| 5,020,687 A | 6/1991 | Seizert | |
| 5,030,687 A * | 7/1991 | Leone | C10M 159/22 |
| | | | 508/460 |
| 5,194,212 A * | 3/1993 | Bonnett | B29C 49/24 |
| | | | 156/245 |
| 5,258,159 A * | 11/1993 | Freeman | B29C 70/086 |
| | | | 264/258 |
| 5,398,839 A | 3/1995 | Kleyn | |
| 6,071,370 A | 6/2000 | Stiles | |
| 6,857,534 B1 | 2/2005 | Keller | |
| 7,771,805 B1 * | 8/2010 | Negandhi | B29C 41/04 |
| | | | 220/601 |
| 2002/0110658 A1 * | 8/2002 | Lucke | B29C 43/184 |
| | | | 428/35.7 |
| 2004/0096611 A1 | 5/2004 | Lucke et al. | |
| 2004/0224177 A1 | 11/2004 | Delusky et al. | |
| 2005/0089688 A1 * | 4/2005 | Mungioli | B32B 7/06 |
| | | | 428/411.1 |
| 2006/0068141 A1 * | 3/2006 | Tsutsumi | B29B 9/14 |
| | | | 428/36.4 |
| 2010/0212806 A1 | 8/2010 | Lemoine et al. | |
| 2011/0062163 A1 * | 3/2011 | Hewkin | F01P 11/029 |
| | | | 220/562 |
| 2011/0146895 A1 * | 6/2011 | Borchert | B60K 15/03177 |
| | | | 156/245 |
| 2013/0037549 A1 | 2/2013 | Martin et al. | |
| 2014/0023808 A1 | 1/2014 | Bzducha et al. | |
| 2014/0326732 A1 * | 11/2014 | Hutzen | B29C 49/04 |
| | | | 220/562 |

FOREIGN PATENT DOCUMENTS

| | | | | |
|---|---|---|---|---|
| EP | 0775606 A2 | 5/1997 | | |
| FR | 2815567 A1 | 4/2002 | | |
| GB | 2430183 A | * 3/2007 | ........... B60K 15/067 |
| JP | H10231998 A | 9/1998 | | |
| JP | 2004098886 A | * 4/2004 | | |
| WO | WO 9412334 A1 | * 6/1994 | ............. B29C 49/20 |
| WO | 2007045466 A1 | 4/2007 | | |
| WO | 2008003386 A1 | 1/2008 | | |
| WO | 2011077527 A1 | 6/2011 | | |

OTHER PUBLICATIONS

PCT International Preliminary Report on Patentability dated Oct. 1, 2015, received in corresponding PCT Application No. PCT/EP14/55271, 8 pgs.

* cited by examiner

OPERATING-FLUID CONTAINER

The invention relates to an operating-fluid container for a motor vehicle, comprising a container body which is assembled from at least two mutually complementary injection-moulded shells which consist of thermoplastic material and are welded together in an encircling manner to form a substantially closed hollow body.

An injection-moulded container of this type, for example, is disclosed in DE 199 09 041 A1. An injection-moulded container which is assembled from two container halves, the container halves in each case having been manufactured by injection moulding, is disclosed in EP 0 775 606 A2. Finally, a container assembled from injection-moulded half-shells is disclosed in U.S. Pat. No. 5,398,839 A. This document describes an injection-moulded fuel tank which is assembled from two multi-layered half-shells, said half-shells being in each case assembled using one inner shell and one outer shell consisting of injection-moulded plastic.

Operating-fluid containers in the sense of the present invention are non-stationary containers for motor vehicles, such as e.g. wiper-fluid containers, oil containers, refrigerant containers for air-conditioning units, containers for receiving liquid additives for emission reduction by way of a catalytic convertor, or also fuel tanks for receiving diesel or petrol fuels.

Being containers installed in a motor vehicle, all aforementioned containers have to conform to particular safety requirements with respect to the stability of the container and with respect to the tightness of the systems. Within certain limits, stability and tightness are interdependent.

Accordingly, for example, all of the aforementioned containers have to be capable of absorbing, in a non-destructive manner, deformation forces as a result of a crash. This applies, in particular, to fuel tanks, since it must always be prevented in the event of a crash that fuel is discharged to the environment in an unimpeded manner. Also, oil containers and other containers for secondary liquids, such as e.g. also containers for receiving refrigerant for air-condition units, should be able to withstand certain deformation forces in a crash, in order also in this case to prevent possibly environmentally harmful substances from being released. Moreover, containers containing aqueous liquids should be able to withstand a certain degree of freezing pressure. This applies, in particular, to additive containers and to containers for receiving screen-wash fluid.

Finally, it is desirable to form such containers, in particular fuel tanks, in such a way that they do not bulge or sag when filled, for example in the case of comparatively high ambient temperatures.

As a measure for structural stiffening of container bodies, it is known to provide supports, tie rods, or similar inside the container. It is likewise known to manufacture container shells from a composite material which has a comparatively low weight and, at the same time, higher strength, by way of extrusion blow-moulding or vacuum forming.

The manufacture of such container shells from composite materials is comparatively simple and typically takes place in multiple steps. To this end, it is known, for example in the case of extrusion blow-moulding, to insert what are referred to as prepregs into the mould and to form one or more preforms made from thermoplastic material against said prepregs.

These measures serve, in particular, for stiffening large two-dimensional regions of the container body, whereas supports and tie rods within the container reinforce specific critical regions of the container using a comparatively low investment in material. However, such measures have the disadvantage that they are at the expense of the interior volume of the container.

The invention is based on the object of providing an operating-fluid container of the type mentioned at the outset which, using comparatively simple means and a low outlay, conforms to higher strength requirements.

The object is achieved by the features of claim 1. Advantageous embodiments of the invention emerge from the dependent claims.

According to one aspect of the invention, an operating-fluid container for a motor vehicle, comprising a container body which is assembled from at least two mutually complementary injection-moulded shells which consist of thermoplastic material and are welded together in an encircling manner to form a substantially closed hollow body, is provided, wherein, at least in regions, a fibre-reinforced thermoplastic material has been injection-moulded in the container body. In this manner, fibre-reinforced regions and non-fibre-reinforced regions result, such that the container can be reinforced in a targeted manner in regions which are particularly critical with respect to the deformation behaviour of the container. For example, it is possible here to reinforce the container in corners, or such wall portions or wall regions that have a large two-dimensional area and, therefore, tend to sag in the direction of weight of the container when the container is filled.

According to a further aspect of the invention, an operating-fluid container for a motor vehicle, comprising a container body which is assembled from at least two mutually complementary injection-moulded shells which consist of thermoplastic material and are welded together in an encircling manner to form a substantially closed hollow body, is provided, wherein at least one shell is at least in regions formed from thermoplastic materials having different strengths, wherein at least one part-region consists of a thermoplastic material having a fibrous filling, wherein the shells have been obtained by way of a co-injection process during injection moulding.

The fibrous filling may be selected, for example, from a group comprising glass fibres, carbon fibres, aramid fibres or polyamide fibres.

The fibres are preferably embedded in a matrix of polyethylene, preferably of HDPE.

The respective thermoplastic material having a fibrous filling may comprise, for example, a filling of 25 to 45% by weight of glass fibres, wherein the fibres may have a length of between 0.5 mm and 12 mm and a diameter of between 9 and 14 µm.

The shells may be formed so as to be either single-layered or multi-layered.

For example, at least one shell may have at least one outer layer consisting of a first thermoplastic material and at least one inner layer consisting of a second thermoplastic material, wherein the first and the second thermoplastic material have different physical properties and/or are structurally different. Such an arrangement of layers can also be achieved by way of co-injection during injection moulding. If applicable, one of the two layers may be a barrier layer for hydrocarbons, for example in the case when the container is to be used as a fuel tank. In this case, a three-layered wall construction would be favourable, a first outer layer and a second inner layer being able to enclose an intermediate layer, which may consist of, for example, EVOH or another barrier material, between them.

In the case of a multi-layered configuration of at least one shell, for example, one inner and/or one outer layer of at least one shell may be fully filled with fibres.

In a particularly favourable variant of the operating-fluid container according to the invention, at least one shell has at least one integrally moulded-on retaining lug or retaining cleat consisting of a fibre-reinforced plastic. Said retaining lug or retaining cleat is preferably integrally moulded-on and serves for fastening the operating-fluid container on the body of a motor vehicle. Employing fibre-reinforced materials for forming the retaining lugs or retaining cleats has the advantage that, under certain circumstances, metallic retaining elements or tension straps are not required for fastening the operating-fluid container.

In one advantageous variant of the operating-fluid container according to the invention it may be provided that a shell forming a container bottom is, in regions, reinforced with a fibrous filler material.

In one variant of the operating-fluid container according to the invention it may be provided that at least one shell comprises a thermoplastic material having a fibrous filler material which runs in the form of one or more tapes within an unfilled thermoplastic material. Such tapes may be injection-moulded in the base material and also run, for example, in patterns and/or in an intersecting manner within the unfilled plastic material which forms a base material.

Figure 2:
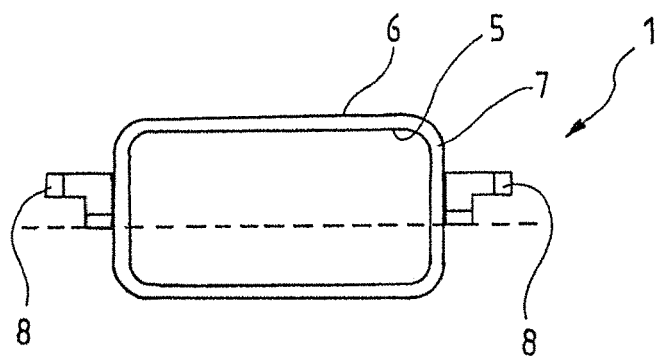
Figure 3:
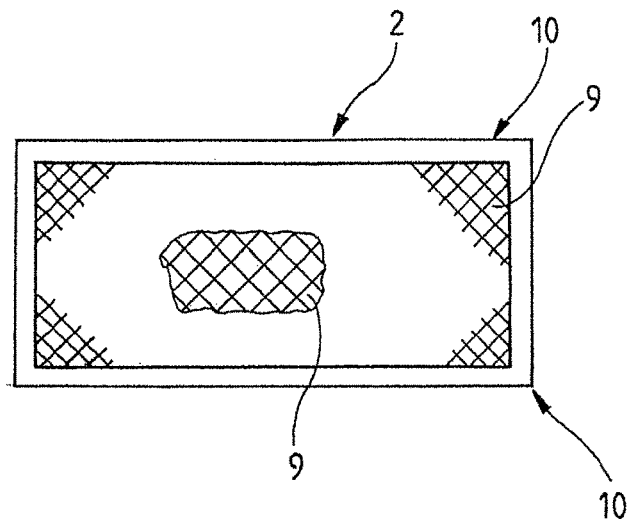
Figure 4:
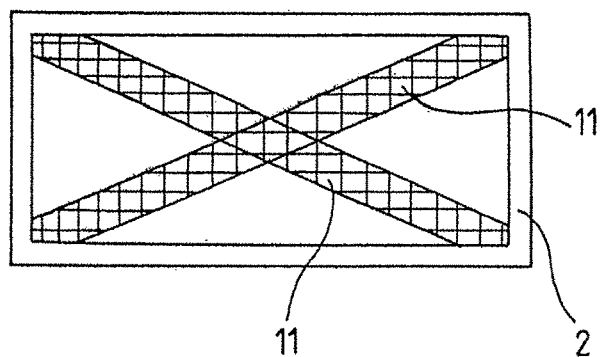

The invention is explained below by means of an exemplary embodiment illustrated in the drawings, in which:

FIG. 1 shows a sectional exploded view of an operating-fluid container according to the invention, FIG. 2 shows an illustration of an operating-fluid container according to the invention, having fastening means which are moulded-on on the outside, FIG. 3 shows a plan view of a shell of the operating-fluid container, which is, in regions, reinforced with a fibrous filler material, according to a first variant, and FIG. 4 shows a plan view of a shell of the operating-fluid container, which is, in regions, reinforced with a fibrous filler material, according to a further variant.

The operating-fluid container 1 according to the invention is substantially assembled from two injection-moulded shells 2a, 2b, wherein the shell 2a forms an upper shell and the shell 2b forms a lower shell of the operating-fluid container 1. The shells form in each case a peripherally encircling flange 3a, 3b, on which the shells 2 are welded to one another to form the closed operating-fluid container. Each of the shells 2 has been obtained by way of co-injection moulding, wherein both the upper shell and the lower shell, in the illustrated exemplary embodiment according to FIG. 1, have in each case integrally moulded-on structures, for example in the form of separation-wall elements 4a, 4b.

In the exemplary embodiment of the invention illustrated in FIG. 1, the shells 2 are in each case formed as two layers, comprising an inner layer 5 and an outer layer 6. These layers are formed from different thermoplastic materials having different strengths and/or different molecular structures. The multi-layered construction of the shells has been obtained by way of co-injection moulding of different plastic materials.

In principle, the shells 2 of the operating-fluid container according to the invention may be formed as a single layer, without departing from the basic concept of at least one of the shells being formed from two different plastic materials having different strengths.

In principle, it is also within the sense of the invention for one or both shells 2 of the operating-fluid container 1 to be formed in each case as multiple layers, at least one of the shells 2 having multiple two-dimensional regions consisting of different thermoplastic materials.

Various thermoplastic materials in the sense of the invention are also those which are, on the one hand, filled and, on the other hand, unfilled but which comprise an identical material/plastic material for the matrix.

Thermoplastic materials to be considered are, for example, polyethylene, polypropylenes, polyamides, ABS, PTFE, polycarbonate, POM, or the like.

As already mentioned above, for the purpose of structural reinforcement of the operating-fluid container 1 according to the invention, at least one shell 2 is, at least in regions, provided with a fibrous filling in the form of, for example, carbon fibres, glass fibres, aramid fibres, polyamide fibres, or the like. The glass fibres may have a length of 0.5 mm to 12 mm and a diameter of 9 to 14 µm.

In one variant of the operating-fluid container 1 according to the invention illustrated in FIG. 2, both shells have a three-layered construction, wherein an inner layer consists of a thermoplastic material having a heat-conducting filler material, an intermediate layer 7 consists of a foamed thermoplastic material, and an outer layer consists of a thermoplastic material based on HDPE. Fastening lugs 8 are integrally moulded-on to the outer layer 6 of the upper shell 2a. Fastening lugs 8 likewise consist of a thermoplastic material based on HDPE, which is provided with a fibrous filling in the form of glass fibres which significantly increase the strength of the fastening lugs 8.

In the case of the variant of the operating-fluid container 1 illustrated in FIG. 3, one shell 2 is formed from two different plastic materials based on HDPE, wherein a second fibre-filled thermoplastic material has been injection-moulded in regions of a first thermoplastic material. The structurally reinforced two-dimensional regions 9 are shown in hatched lines in FIG. 3. Said regions 9 are provided, for example, in the corner regions 10 and for instance in the two-dimensional centre of the shell 2.

A further variant of the operating-fluid container 1 according to the invention is illustrated in FIG. 4 which likewise illustrates a plan view of a shell 2 of the operating-fluid container. Said shell 2 likewise consists of two different thermoplastic materials, i.e. an unfilled thermoplastic material and a fibre-filled thermoplastic material, the latter being injection-moulded, in the form of mutually intersecting strips 11, into the first thermoplastic material of the shell forming the base material.

LIST OF REFERENCE SIGNS

1 Operating-fluid container
2a Upper shell
2b Lower shell
3a, 3b Flange
4a, 4b Separation-wall elements
5 Inner layer
6 Outer layer
7 Intermediate layer
8 Fastening lugs
9 Two-dimensional regions
10 Corner regions
11 Strips

What is claimed is:

1. An operating-fluid container for a motor vehicle, comprising:
a container body having at least two mutually complementary injection-moulded shells of thermoplastic material, wherein the at least two shells include a first shell and a second shell, wherein the first shell and the second shell are welded together in an encircling manner to form a substantially closed hollow body, wherein at least one of the first shell and the second shell has a first layer formed of a first thermoplastic material and a second thermoplastic material, wherein the first thermoplastic material is a different material from the second thermoplastic material, wherein the first thermoplastic material and second thermoplastic material are located in different regions of the first layer, such that the first thermoplastic material is located in a first thermoplastic material region of the first layer not including the second thermoplastic material and the second thermoplastic material is located in a second thermoplastic material region of the first layer not including the first thermoplastic material, and the first thermoplastic material and the second thermoplastic material are disposed lateral to one another in the first layer, wherein the second thermoplastic material includes a fibrous filling, wherein the first layer and the second layer are each injection-moulded.

2. The operating-fluid container according to claim 1, wherein the fibrous filling comprises at least one of glass fibres, carbon fibres, aramid fibres and polyamide fibres.

3. The operating-fluid container according to claim 1, wherein the second thermoplastic material comprises fibres of the fibrous filling embedded in polyethylene.

4. The operating-fluid container according to claim 3, wherein the polyethylene is HDPE.

5. The operating-fluid container according to claim 1, wherein at least one of the first shell and the second shell has a multi-layered wall construction.

6. The operating-fluid container according to claim 1, wherein the first thermoplastic material and the second thermoplastic material have different physical properties and/or different molecular structures.

7. The operating-fluid container according to claim 1, wherein the first layer is an outer layer of the container.

8. The operating-fluid container according to claim 1, wherein at least one of the first shell and the second shell has at least one integrally moulded-on retaining lug and/or retaining cleat.

9. The operating-fluid container according to claim 1, wherein the first layer including the second thermoplastic material is located on a bottom of the container.

10. The operating-fluid container according to claim 1, wherein the first thermoplastic material is an unfilled thermoplastic material.

11. The operating-fluid container according to claim 1, wherein the first layer including the second thermoplastic material is located in at least one corner region of the container.

12. The operating-fluid container according to claim 1, wherein at least one of the first thermoplastic material and the second thermoplastic material is formed of at least one of polyethylene, polypropylene, polyamide, ABS, PTFE, polycarbonate and POM.

* * * * *